July 14, 1970
C. E. GLACKMAN
3,520,147
CONTROL CIRCUIT
Filed July 10, 1968
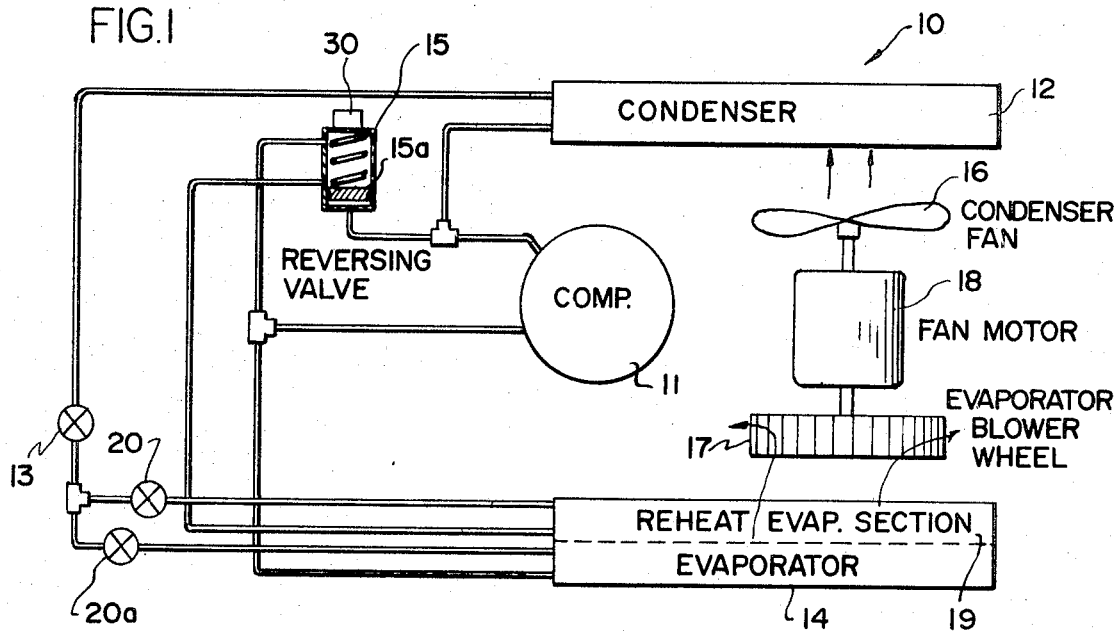
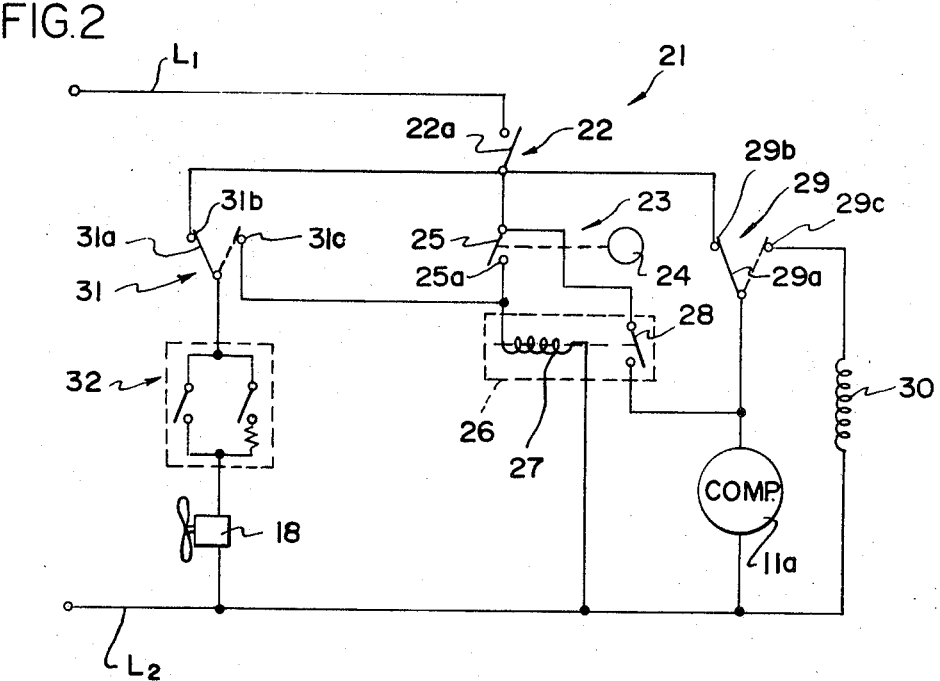
INVENTOR.
CHARLES E. GLACKMAN
BY Hofgren, Wegner, Allen, Stellman & McCord
ATTORNEYS.

United States Patent Office 3,520,147
Patented July 14, 1970

3,520,147
CONTROL CIRCUIT
Charles E. Glackman, Elberfeld, Ind., assignor to Whirlpool Corporation, a corporation of Delaware
Filed July 10, 1968, Ser. No. 743,880
Int. Cl. F25b 29/00
U.S. Cl. 62—173
8 Claims

ABSTRACT OF THE DISCLOSURE

A control circuit for use in an air-conditioning apparatus or the like, including a humidistat for controlling the air-conditioning apparatus to function as an automatic dehumidifying apparatus. The apparatus includes a reversing valve for utilizing a reheat evaporator section for warming the dehumidified refrigerated air before delivering it to the room being dehumidified. A thermostat switch is provided for controlling the fan in conjunction with the humidistat control. A two-speed selector switch is provided for controlling the fan.

BACKGROUND OF THE INVENTION

Field of the invention

This invention relates to control circuits, and in particular, to control circuits for use in air conditioners for controlling the operation of the air conditioner selectively as an air-cooling means and an air-dehumidifying means.

Description of the prior art

In one conventional form of air-conditioner circuitry, means are provided for operating the air conditioner at a temperature below the set temperature in order to dehumidify the air being treated. The dehumidification is effected by firstly cooling the air to a relatively low temperature to remove moisture therefrom, and then reheating the low temperature air to approximately room temperature before delivering it to the room. In the conventional dehumidifying air conditioners, fans were provided for use in connection with the evaporator and the condenser and the control circuitry was arranged so that such fans were operated continuously when the master switch of the air conditioner was closed.

An improved form of such dehumidifier is one provided with an automatic fan shutoff. However, in such dehumidifiers, it is necessary to provide a more complicated control circuit in order to energize concurrently the fan motor and the compressor in the event that the fan is deenergized when the humidistat switch closes to call for a dehumidifying operation.

SUMMARY OF THE INVENTION

The present invention comprehends an improved control circuit for use in such automatic fan shutoff type dehumidifiers, wherein a thermostat selector switch is provided in combination with the humidistat switch for improved selective control of the fan and compressor.

BRIEF DESCRIPTION OF THE DRAWINGS

Other features and advantages of the invention will be apparent from the following description taken in connection with the accompanying drawing wherein:

FIG. 1 is a schematic flow diagram of an air conditioner of the dehumidifying type; and FIG. 2 is a schematic wiring diagram of a control circuit embodying the invention for use in connection therewith.

DESCRIPTION OF THE PREFERRED EMBODIMENT

In the exemplary embodiment of the invention as disclosed in FIG. 1 of the drawing, an air conditioner apparatus capable of functioning either solely as a dehumidifier or as a combined dehumidifier and air cooler is generally designated 10. Apparatus 10 includes a compressor 11 for compressing a refrigerant fluid and a condenser 12 for cooling the hot compressed refrigerant, thereby liquifying it. Assuming apparatus 10 to be in the combined dehumidifying and air cooling mode of operation, a three-way valve 15 having a spring-biased valve body 15a actuated by a solenoid coil 30 will be in the position shown in FIG. 1. Thus, all compressed refrigerant from compressor 11 is delivered to condenser 12. After cooling and liquification in the condenser, the refrigerant is delivered through a suitable restrictor 13 to a pair of restrictors 20 and 20a. Refrigerant passing through restrictor 20a enters a conventional evaporator 14 and that passing through restrictor 20 enters a reheat evaporator section 19 which functions as a normal evaporator coil during this combined dehumidifying-cooling operation. Refrigerant from evaporator 14 returns directly to compressor 11 whereas refrigerant from reheat evaporator section 19 returns to the compressor via the upper two ports of reversing valve 15 which are in communication with each other. Heat is removed from the refrigerant in condenser 12 by means of an air flow therethrough induced by a conventional condenser fan 16 and refrigerated air flow may be effected by air flow in heat exchange relationship with the evaporator 14 and reheat evaporator 19 by means of a blower 17. In the illustrated embodiment, each of the condenser fan and the evaporator blower may be driven by a single electric motor 18.

When apparatus 10 is operated as a dehumidifier only, solenoid coil 30 is energized. This lifts body 15a against the spring bias applied thereto and the lower two ports of valve 15 are put in communication whereas the upper port is blocked. Compressed refrigerant from compressor 11 now divides into two portions; a first portion which is delivered to condenser 12 and a second portion which passes through the lower two ports of valve 15 and on to reheat evaporator section 19. Liquified refrigerant exiting from condenser 12 now passes through restrictors 13 and 20a into evaporator 14. Liquified refrigerant from reheat evaporator section 19 (which now functions as a condenser) is also delivered to evaporator 14 through restrictors 20 and 20a. Refrigerant exiting evaporator 14 is then led back to compressor 11. With this flow of refrigerant, air drawn through evaporator 14 is cooled and has moisture condensed therefrom. However, as the air passes on through reheat evaporator section 19 (which now functions as a condenser), it is reheated prior to its delivery back into the room. The above described elements of the apparatus 10 are of conventional construction well known in the art and need no further description here.

Referring now to FIG. 2, an improved operation of apparatus 10 is effected herein by means of a novel control circuit generally designated as 21. More specifically, power may be supplied to the apparatus 10 from a conventional power supply including a first power supply lead L1, and a second power supply lead L2. The apparatus 10 may include a master switch generally designated 22. Switch 22 may comprise a conventional single pole, single throw switch. Dehumidification operation of the apparatus 10 is controlled by conventional humidistat 23 including a humidity sensing element 24 and a single pole, single throw switch 25 controlled by the sensing element. A power relay 26 may be provided including a relay coil 27 and a single pole, single throw switch 28. Switches 22 and 25 and relay coil 27 are connected in series between power supply leads L1 and L2. Relay switch 28 is connected from between switches 22 and 25 to compressor motor 11a, which, in turn, is connected to power supply lead L2.

A conventional snap acting, single pole, double throw thermostat switch generally designated 29, has its moving contact 29a connected to compressor 11a and includes a first fixed contact 29b connected to the moving contact 22a of switch 22. A second fixed contact 29c of switch 29 is connected to a solenoid 30 for operating the reversing valve 15.

Fan motor 18 is connected to a single pole, double throw selector switch 31 through a speed selector switch generally designated 32. The selector switch 31 includes a moving contact 31a connected to the speed selector switch 32, a first fixed contact 31b connected to the moving contact 22a of switch 22, and a second fixed contact 31c connected to the fixed contact 25a of humidistat switch 25 and the coil 27. The selector switch 31 comprises a thermostatic snap acting fan control switch which is set to operate from three to five degrees Fahrenheit below the operating thermostat 29 temperature.

Thus, the control circuit 21 effectively defines means for operating the apparatus 10 to selectively dehumidify or cool air to be conditioned. The control 21 includes switch means for electrically connecting the fan 18 and the compressor motor 11a in parallel between power supply leads L1 and L2, when the air to be conditioned is at least a preselected temperature. Under these conditions, switches 29 and 31 are disposed as shown in FIG. 2, master switch 22 having been closed to connect the apparatus 10 to the power supply leads L1 and L2. When, however, the temperature drops to the operating point of the thermostat switch 29, the moving contact 29a is thrown to fixed contact 29c, thereby discontinuing energization of the compressor motor. The fan control thermostat 31 continues to connect fan motor 18 through switch 22 to power supply lead L1 until the temperature sensed thereby is the set point thereof, at which time the moving contact 31a snaps to engage fixed contact 31c, discontinuing energization of the fan motor 18.

However, in the event that, notwithstanding a relatively low temperature of the room air, the humidity is relatively high, humidistat switch 25 will be closed by the sensing element 24, thereby providing a connection from power supply lead L1 to fixed contact 31c of switch 31 for energizing fan motor 18 through switch 31 and switch 32. At the same time, the closing of switch 25 energizes coil 27 thereby closing switch 28 and connecting the compressor motor 11a across the power supply. However, as moving contact 29a of switch 29 is now in contact with fixed contact 29c, reversing solenoid coil 30 is energized in parallel with the compressor motor 11a so as to cause reversing valve 15 to deliver hot refrigerant to the reheat evaporator section 19 thereby causing the evaporator to function as a dehumidifying device, as discussed above. This dehumidifying functioning continues until the humidistat element 24 senses a sufficiently low humidity condition to reopen switch 25. It should be noted that control circuit 21 gives preference to the cooling operation over the dehumidification operation should the temperature in the room rise to a point requiring cooling. This is accomplished as follows: Assume initially that the temperature in the room is below a point requiring cooling but the room humidity is high, thus making dehumidification desirable. With this set of conditions, humidistat element 24 closes switch 25, movable contact 31a of switch 31 communicates with stationary contact 25a, and movable contact 29a of switch 29 contacts stationary contact 29c. This will energize fan motor 18, compressor motor 11a, and reversing valve 30; thus, the unit porforms only a dehumidification operation. As the temperature rises, moveable contact 31a of switch 31 transfers to contact 31b. This keeps the fan motor 18 energized. Should the temperature rise another 3 or 4 degrees to a point at which cooling is desirable, moveable contact 29a of switch 29 transfers to contact 29b and reversing valve 30 is deenergized. The unit now is in a cooling mode of operation. From the description, it is apparent that the cooling operation, when needed, is a master over the dehumidification operation. It is, of course, apparent that, even though the unit is referred to as being in a cooling mode, dehumidification of room air continues to take place as hot, humid air contacts the evaporator.

Circuit 21 further permits an automatic fan on-off operation as the dehumidifying operation of the apparatus 10 is cycled on and off in a novel and simple manner. This is accomplished by connecting switch 31 such that in a first position, it is in series with humidistat switch 25 and in a second position, it is in parallel therewith. This arrangement provides an improved simplified functioning whereby the highly desirable automatic control is effected by extremely simple and economical means.

While I have shown and described one embodiment of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. In an air-conditioning apparatus having an electrically operable compressor, a condenser, an evaporator, and a fan for flowing air to be conditioned in heat exchange relationship with said evaporator, control means for operating said apparatus to dehumidify and cool the air to be conditioned comprising: first switch means responsive to the temperature of said air to be conditioned for energizing said compressor and said fan when the air exceeds a pre-selected temperature and for deenergizing the compressor when the temperature of the air is below said preselected temperature and above a second temperature, lower than said preselected temperature, and for deenergizing said fan when the temperature of the air is below said second temperature; and second switch means, connected in circuit with said first switch means, responsive to the humidity of said air to be conditioned for energizing the compressor and the fan through said first switch means when the temperature of the air is below said second temperature and the humidity of the air is above a preselected level.

2. The control means of claim 1 wherein said second switch means is connected in circuit with said first switch means for energizing said compressor through said first switch means when the temperature of the air to be conditioned is intermediate said preselected temperature and said second temperature and the humidity is above the preselected level.

3. In an air-conditioning apparatus having an electrically operable compresser, a condenser, an evaporator including a reheat portion, a fan for flowing air to be conditioned in heat exchange relationship with said evaporator, and electrically operated valve means for selectively directing heating refrigerant to the reheat portion or directing cooling refrigerant to said reheat portion, control means for operating said apparatus to selectively dehumidify or dehumidify and cool the air to be conditioned comprising: first switch means responsive to the temperature of said air to be conditioned for energizing said compresser and said fan when the air exceeds a preselected temperature and for deenergizing the compresser when the temperature of the air is below said preselected temperature and above a second temperature, lower than said preselected temperature, and for deenergizing said fan when the temperature of the air is below said second temperature; and second switch means, connected in circuit with said first switch means, responsive to the humidity of said air to be conditioned for energizing the compresser, the fan and the valve through said first switch means when the temperature of the air is below said second temperature and the humidity of the air is above a preselected level and for energizing said compresser and said valve through said first switch means when the temperature of the air to be conditioned is intermediate said preselected temperature and said second temperature and the humidity of said air is above the preselected level.

4. The control means of claim 3 wherein a humidity sensitive element actuates the second switch means when the humidity of said air exceeds the preselected level and the first switch means include a fan switch selectively connecting said fan in parallel with said second switch means when the air is at a temperature above said second temperature and in series therewith when the air is at a temperature below said second temperature.

5. The control means of claim 3 wherein the first switch means includes a compresser switch selectively connecting the valve means in parallel with the compresser when the temperature of the air to be conditioned is below said preselected temperature.

6. The apparatus of claim 5 wherein said control means includes a relay having a coil and a normally open relay switch, said coil being in series with said second switch means, said relay switch and said compresser being connected in series and said series connected relay switch and compresser being connected in parallel with said series connected coil and second switch means.

7. The apparatus of claim 3 wherein said control means includes a humidity sensitive element for actuating said second switch means when the humidity of the air to be conditioned exceeds the preselected level, a relay having a coil in series with the second switch means and said first switch means includes a fan switch to connect said fan in parallel with said relay coil when the temperature of said air is below the second temperature or in parallel with said series connected second switch and said relay coil when the temperature of the air exceeds said preselected temperature.

8. The apparatus of claim 3 wherein said first switch means includes a single-pole, double-throw switch having a moving contact connected to the fan, a first fixed contact connected to a power supply lead and a second fixed contact connected to said power supply lead through said second switch means.

References Cited

UNITED STATES PATENTS

| | | | |
|---|---|---|---|
| 2,296,530 | 9/1942 | McGrath | 62—176 |
| 3,293,874 | 12/1966 | Gerteies | 62—176 |
| 3,203,196 | 8/1965 | Malkoff | 62—173 |
| 2,952,989 | 9/1960 | Gould | 62—173 |

WILLIAM J. WYE, Primary Examiner

U.S. Cl. X.R.

62—176, 160; 307—116